(12) United States Patent
Reiter et al.

(10) Patent No.: US 10,208,814 B1
(45) Date of Patent: Feb. 19, 2019

(54) TWO-WAY CLUTCH ASSEMBLY

(71) Applicants: Bradley Reiter, Wilcox, PA (US); Gary L. Anderson, St. Marys, PA (US)

(72) Inventors: Bradley Reiter, Wilcox, PA (US); Gary L. Anderson, St. Marys, PA (US)

(73) Assignee: Keystone Powdered Metal Company, St. Marys, PA (US)

( * ) Notice: Subject to any disclaimer, the term of this patent is extended or adjusted under 35 U.S.C. 154(b) by 741 days.

(21) Appl. No.: 14/669,405

(22) Filed: Mar. 26, 2015

Related U.S. Application Data

(60) Provisional application No. 61/971,944, filed on Mar. 28, 2014.

(51) Int. Cl.

| | |
|---|---|
| *F16D 41/16* | (2006.01) |
| *C22C 38/12* | (2006.01) |
| *C22C 38/08* | (2006.01) |
| *F16D 27/09* | (2006.01) |
| *C22C 38/18* | (2006.01) |

(52) U.S. Cl.
CPC .............. *F16D 41/16* (2013.01); *C22C 38/08* (2013.01); *C22C 38/12* (2013.01); *C22C 38/18* (2013.01); *F16D 27/09* (2013.01)

(58) Field of Classification Search
CPC .......... F16D 41/12; F16D 41/16; F16D 27/09; C22C 38/08; C22C 38/18; C22C 38/12
See application file for complete search history.

(56) References Cited

U.S. PATENT DOCUMENTS

| | | | |
|---|---|---|---|
| 5,070,978 A | 12/1991 | Pires | 192/45.1 |
| 5,806,643 A | 9/1998 | Fitz | 192/45.1 |
| 5,954,174 A | 9/1999 | Costin | 192/46 |
| 7,100,756 B2 | 9/2006 | Kimes et al. | 192/46 |
| 7,223,198 B2 | 5/2007 | Kimes et al. | 475/331 |
| 7,383,930 B2* | 6/2008 | Kimes | F16D 41/12 192/113.32 |
| 7,448,481 B2 | 11/2008 | Kimes et al. | 192/46 |
| 7,451,862 B2 | 11/2008 | Kimes et al. | 192/46 |
| 7,455,156 B2 | 11/2008 | Kimes et al. | 192/46 |
| 7,455,157 B2 | 11/2008 | Kimes et al. | 192/46 |
| 7,455,711 B1* | 11/2008 | Kosco | B22F 3/12 419/25 |
| 2001/0030589 A1* | 10/2001 | Dahlgren | H01F 7/1615 335/220 |
| 2014/0102844 A1* | 4/2014 | Greene | F16D 41/16 192/45.1 |

* cited by examiner

*Primary Examiner* — Mark A Manley
(74) *Attorney, Agent, or Firm* — Alvin T. Rockhill

(57) ABSTRACT

The present invention discloses a clutch assembly which is comprised of (1) a cam plate which includes cams which are spaced about a central axis; (2) a rocker plate which includes at least one pocket, wherein the pocket includes a first rocker plate engagement surface and a second rocker plate engagement surface; and (3) at least one rocker which is pivotally situated within the pocket of the rocker plate, (4) a first solenoid, and (5) a second solenoid, wherein the solenoids can be activated or deactivated to allow for the clutch to be in a neutral position (to allow for free rotation in both clockwise and counterclockwise directions), to prevent rotation in a clockwise direction while allowing for free rotation in a counterclockwise direction, or to prevent rotation in a counterclockwise direction while allowing for free rotation in a clockwise direction.

14 Claims, 4 Drawing Sheets

TWO-WAY CLUTCH ASSEMBLY

This application claims the benefit of U.S. Provisional Patent Application Ser. No. 61/971,944, filed on Mar. 28, 2014. The teachings of U.S. Provisional Patent Application Ser. No. 61/971,944 are incorporated by reference herein in their entirety.

FIELD OF THE INVENTION

The invention relates to a two-way clutch that can optionally produce a drive connection between components when their relative rotation is in a first direction or a second direction (clockwise or counterclockwise), but which overruns when the relative rotation is in the opposite direction. The two-way clutch can also operate in a neutral position which does not produce a drive connection in either direction and while in the neutral position operates with virtually no drag. Additionally, the two-way clutches of this invention utilize one or more solenoids to engage the clutch so as to produce a drive connection in one direction or the other (clockwise or counterclockwise, or in the case of a multiple rocker clutch assembly, by energizing at least one clockwise and at least one counterclockwise solenoid in different pocket modules).

BACKGROUND OF THE INVENTION

Clutches are used in the transmission of power in a wide variety of mechanical devices, including automobiles, trucks, motorcycles, aircraft, mining equipment, construction equipment, industrial equipment, agricultural equipment, and the like. In any case, a clutch is used in the transmission of power from one component of a mechanical device to another component of the device. The clutch typically transfers power from one component of the clutch (a driving member) to another component of the clutch (a driven member) when the clutch is engaged, but does not transfer power when the clutch is not engaged. For instance, the clutch can be designed to transfer power from a cam plate to a rocker plate which are contained within the clutch.

Simple one-way clutches of conventional designs can be used to provide a one-way drive connection between inner and outer races. Clutches of this type typically include sprags or rollers which can connect the races in a manner whereby power is transferred between the races when the clutch is engaged, but which can be disengaged at times or under conditions when power transmission is not desired. Such clutches are commonly used in the powertrain or driveline of various automotive vehicles, including automobiles and trucks.

Conventional one-way clutch assemblies have at least one sprag or roller which driveably locks two notched or pocketed races together mutually in one rotary direction and allows the races to rotate freely in the other direction. Rocker and sprag type one-way clutch assemblies can increase the torque capacity for a given package size compared to those of a roller-type clutch, but they are generally limited in torque transmitting capacity by the magnitude of the contact or bearing stresses caused by contact of the rockers or sprags with the races.

The clutch described in U.S. Pat. No. 5,070,978 is reported to overcome the limitation of torque transmitting capacity as well as having additional benefits. The one-way overrunning clutch described in U.S. Pat. No. 5,070,978 includes a drive member and a driven member, which are mounted for clockwise and counterclockwise rotation about a common axis. The drive member includes a planar drive face, normal to the common axis, which connects with a source of power for rotating the planar drive face either clockwise or counterclockwise. The driven member includes a planar driven face, positioned in close proximity to and in confronting relationship with the drive face. The drive and driven members are coupled to one another through a series of pockets in one of the drive faces, and a plurality of cooperating struts carried by the other face, such that when the drive member is driven counterclockwise, it drives the driven member with it. When the drive member is driven clockwise, it does not drive the driven member, but rotates freely relative to the driven member. Column stability of the strut, which transmits the torsion load between the races, is an importance factor in the design.

U.S. Pat. No. 5,954,174 discloses a ratchet one-way clutch assembly having an inner race with notches, an outer race with pockets, and rockers located in the pockets to engage the notches. The rockers of these clutches have a pivot ridge which mates with a peak or recess in the pockets in the outer race to position the rocker in the pocket. The center of mass of each rocker is located such that the rocker tends to engage or disengage a notch in the inner race. The teachings of U.S. Pat. No. 5,954,174 disclose the utilization of a spring to provide a tilting force on each rocker directed to produce engagement of the rocker with a notch of the inner race.

U.S. Pat. No. 5,806,643 discloses a generally L shaped strut that is used in a one-way drive device. This one-way drive device is comprised of (1) a first member rotatable about an axis and including a first generally planar face normal to the axis, the first face including a first recess defining a first shoulder; (2) a second member rotatable about the axis and including a second generally planar face which is positioned in close proximity to and in confronting relationship with the first planar surface, the second face including a second recess defining a second shoulder; and (3) a coupling arrangement operatively extending between the first face and the second face, the coupling arrangement including a strut having a first end surface for engagement with the first shoulder and a second end surface opposite the first end surface for engagement with the second shoulder, wherein a first contact area is achieved upon engagement of the first end surface with the first shoulder and a second contact area is achieved upon engagement of the second end with the second shoulder, the first contact area being substantially larger than the second contact area.

U.S. Pat. No. 7,100,756, U.S. Pat. No. 7,223,198, U.S. Pat. No. 7,383,930, U.S. Pat. No. 7,488,481, U.S. Pat. No. 7,451,862, U.S. Pat. No. 7,455,156, and U.S. Pat. No. 7,455,157 disclose the use of rockers in ratcheting one-way clutch devices. For instance, U.S. Pat. No. 7,455,157 discloses an overrunning clutch including a cam plate formed with cams angularly spaced about a central axis, and a rocker plate that includes pockets angularly spaced about the central axis. Each pocket includes a first concave surface having a center located within the pocket and through which a pivot axis passes. In the design disclosed each pocket contains a rocker that includes a first convex surface complementary to and at least partially surrounded by the first concave surface. Springs, supported on the rocker plate, each urge a rocker to pivot about the pivot axis toward the cam plate.

The some application it is desirable to employ a two-way clutch which can optionally produces a drive connection between components when their relative rotation is in a first direction or a second direction (clockwise or counterclockwise), but which overruns when the relative rotation is in the opposite direction. In some applications, it is also desirable for such a two-way clutch to have a neutral position which does not produce a drive connection in either direction and which operates with virtually no drag while in the neutral position. Conventional two-way clutches typically employ a first/reverse clutch pack which increases the size, cost, and complexity of the clutch assembly. Additionally, such two-way clutches typically utilize hydraulic components which are too slow to be useful in many applications. For instance, hydraulic parts can take up to 0.5 seconds to act with some application demanding an activation time of 20 milliseconds or less. Another drawback associated with conventional two-way clutches is that they cause some degree of drag and the inefficiency associated therewith. In other words, conventional two-way clutches are not typically energy efficient. Conventional two-way clutches also typically lock-up in the case of clutch failure which can lead to a catastrophic condition.

There is a need for an improved two-way clutch which can operate in a neutral position with virtually no drag for high efficiency operation. It would also be highly desirable for such a two-way clutch to be capable of fitting into the envelope of conventional two-way clutches and to be capable of being engaged or disengages in short activation times of 20 milliseconds or less. Such a two-way clutch should also be highly durable, highly reliable, and provide a long trouble-free service life, but to revert to a free-wheeling state on failure to avoid catastrophic damage from occurring. It would also be highly desirable for such a two-way clutch to be of a relatively simple design which is capable of fitting into the envelope of conventional two-way clutches. As always, it would also be desirable for such a two-way clutch to be capable of being produces at a relatively low cost as compared to conventional two-way clutches.

SUMMARY OF THE INVENTION

This invention provides an improved two-way clutch which can operate in a neutral position with virtually no drag for high efficiency operation. It is also of a relatively simple and compact design which is capable of fitting into the envelope of conventional two-way clutches and which can be engaged or disengages in short activation times of 20 milliseconds or less. The two-way clutch of this invention is also highly durable, extremely reliable, and provides for a long trouble-free service life. It is also designed to revert to a free-wheeling state on failure to avoid catastrophic damage from occurring. The two-way clutch of this invention is also amenable to being produced at a relatively low cost as compared to conventional two-way clutches.

The present invention more specifically discloses a clutch assembly which is comprised of (1) a cam plate which includes cams which are spaced about a central axis; (2) a rocker plate which includes at least one pocket, wherein the pocket includes a first rocker plate engagement surface and a second rocker plate engagement surface; and (3) at least one rocker which is pivotally situated within the pocket of the rocker plate, said rocker having a first rocker engagement face, a first concaved region, a second rocker engagement face, and a pivot point, wherein the first rocker engagement face is complimentary to the first rocker plate engagement surface, wherein the second rocker engagement face is complimentary to the second rocker plate engagement surface, wherein the first rocker engagement face is complimentary to the first cam engagement face, wherein the second rocker engagement face is complimentary to the second cam engagement face, wherein pivotally rotating the rockers in a first pivot direction to bring the first rocker engagement face in complimentary contact with the first cam engagement face prevents rotation of the cam plate in a counterclockwise direction, wherein pivotally rotating the rockers is a second pivot direction to bring the second rocker engagement face in complimentary contact with the second cam engagement face prevents rotation of the cam plate in a clockwise direction, a first solenoid which is configured to pivot the rocker in the first pivot direction so as to bring the first rocker engagement face into complimentary contact with the first cam engagement face and to bring the second rocker engagement face into contact with the second rocker plate engagement surface on activation of the first solenoid, and a second solenoid which is configured to pivot the rocker in the second pivot direction so as to bring the second rocker engagement face into complimentary contact with the second cam engagement face and to bring the first rocker engagement face into contact with the first rocker plate engagement surface on activation of the second solenoid.

The subject invention further reveals a rocker which is comprised of a first rocker engagement face, a second rocker engagement face, a first concaved region, a second concaved region, a third concaved region, a tail, and a pivot point, wherein the first concaved region is situated between the first rocker engagement face and the second rocker engagement face, wherein the second concaved region which is situated between the second rocker engagement face and the tail, and a third concaved region which is situated between the tail and the first rocker engagement face.

The present invention also discloses a rocker which is comprised of a first rocker engagement face, a second rocker engagement face, a first concaved region, and a circumferential tail region, wherein the first concaved region is situated between the first rocker engagement face and the second rocker engagement face, and wherein the circumferential tail region extends from the first rocker engagement face to the second rocker engagement face.

Figure 1:
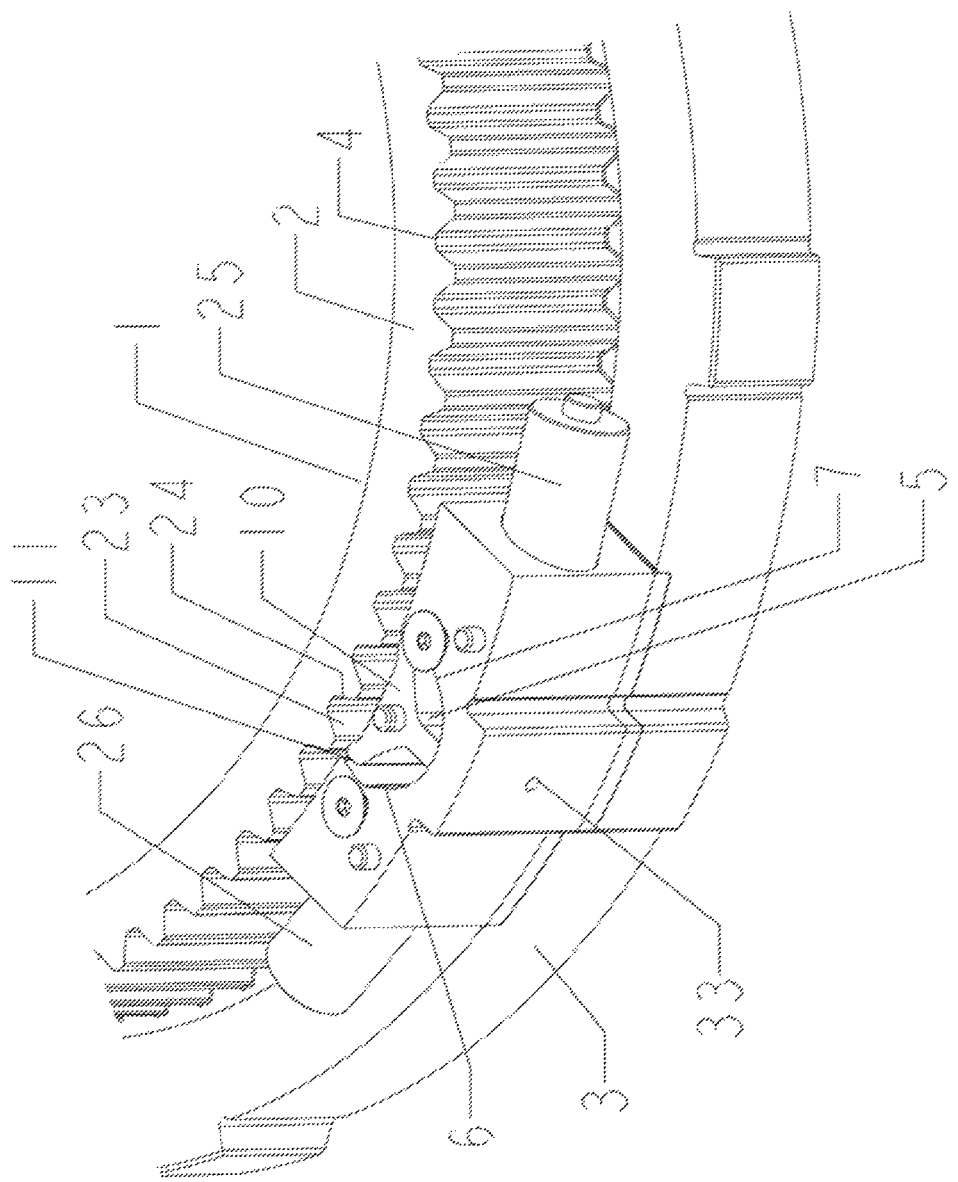
FIG. 1 is a perspective view of a clutch assembly of this invention wherein the clutch is in a neutral position.

The reference numerals which are utilized in the drawings are as follows:
1—clutch assembly
2—cam plate
3—rocker plate
4—cams
5—pockets
6—first rocker plate engagement surface
7—second rocker plate engagement surface
10—rocker
11—first rocker engagement face
12—second rocker engagement face
13—pivot point
14—tail
15—tail end 16—first concaved region
17—second concaved region
18—third concaved region
19—circumferential tail region
20—rocker plate
21—first rocker plate engagement surface
22—second rocker plate engagement surface
23—first cam engagement face
24—second cam engagement face
25—a first solenoid
26—a second solenoid
27—first shoulder
28—second shoulder
29—first spring
30—second spring
31—first spring end
32—second spring end
33—aperture

DETAILED DESCRIPTION OF THE INVENTION

FIG. 1 illustrates a clutch assembly 1 which is comprised of (1) a cam plate 2 which includes cams 4 which are spaced about a central axis; (2) a rocker plate 3 which includes at least one pocket 5, wherein the pocket 5 includes a first rocker plate engagement surface 6 and a second rocker plate engagement surface 7; and (3) at least one rocker 10 which is pivotally situated within the pocket 5 of the rocker plate 3. The clutch assembly 1 illustrated in FIG. 1 is in a neutral position wherein the rocker 10 will not engage the cams 4 of the cam plate 2. However, the first solenoid 25 can be activated to push against the tail 14 of the rocker 10 so as to pivot the rocker 10 in a clockwise direction to bring the second rocker engagement face 11 which is complimentary to the second rocker plate engagement surface 22 into contact with the second rocker plate engagement surface 22. In doing so the first rocker engagement face 11 is pivoted to bring it into contact with the first cam engagement face 23 to which it is complimentary as illustrated in FIG. 2.

Figure 2:
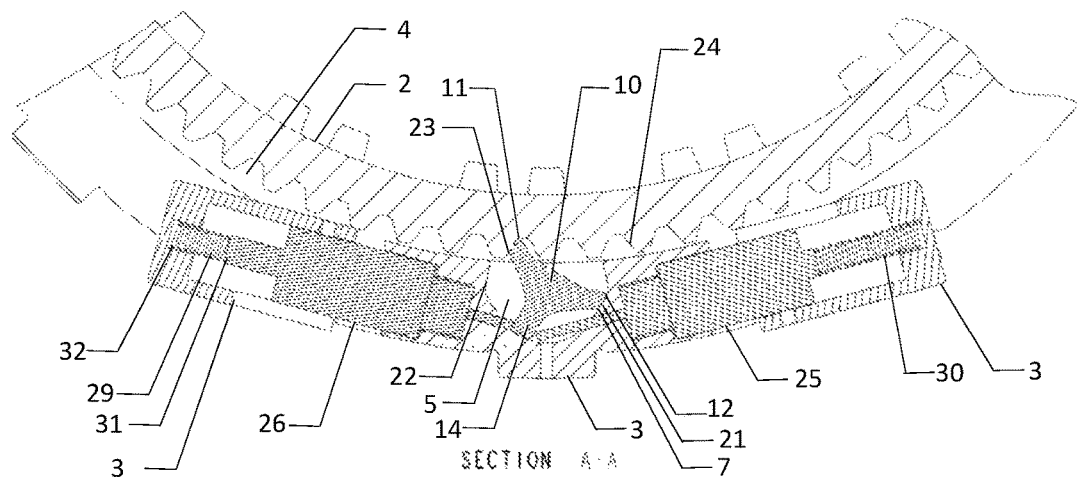
FIG. 2 illustrates the clutch assembly of this invention wherein the clutch is engaged to prevent counterclockwise rotation of the cam plate relative to the rocker plate, but which engagement allows for the cam plate to rotate in a clockwise direction relative to the rocker plate.

As illustrated in FIG. 2 when the first solenoid 25 is activated to bring the first rocker engagement face 11 into contact with the first cam engagement face 23 rotation of the cam plate 2 in a counterclockwise direction relative to the rocker plate 3 is prevented. However, the cam plate 2 is allowed to rotate in a clockwise direction relative to the rocker plate 3 because the second cam engagement face 24 can glide over the first shoulder 27 of the first concaved region 16 of the rocker 10 without engaging the rocker 10. In other words, in this configuration counterclockwise rotation of the cam plate 2 relative to the rocker plate 3 will drive the rocker plate 3 in the same direction (counterclockwise motion). However, in this configuration clockwise rotation of the cam plate 2 relative to the rocker plate 3 will not drive the rocker plate 3. In a similar manner (not illustrated) the second solenoid 26 can be activated to bring the second rocker engagement face 12 into contact with the second cam engagement face 24 to prevent rotation of the cam plate 2 relative to the rocker plate 3 in a clockwise direction. However, when the second solenoid 26 is activated the cam plate 2 is allowed to rotate in a counterclockwise direction relative to the rocker plate 3 because the second cam engagement face 24 can glide over the second shoulder 28 of the second concaved region 16 of the rocker 10 without engaging the rocker 10. In other words, in this configuration clockwise rotation of the cam plate 2 relative to the rocker plate 3 will drive the rocker plate 3 in the same direction (clockwise motion). However, in this configuration counterclockwise rotation of the cam plate 2 relative to the rocker plate 3 will not drive the rocker plate 3.

It is preferred for one or more springs 29, 30 to be included in the clutch assembly to maintain the rocker in a neutral position at times when the clutch assembly is not in a drive position (neither of the solenoids are activated). FIG. 2 illustrates the utilization of a first spring 29 and a second spring 30 which act together to maintain the rocker 10 in a neutral position at times when neither the first solenoid nor the second solenoid are activated. In the embodiment of the invention illustrated in FIG. 2 the first spring 29 has a first spring end 31 which applies pressure to the solenoid 26 to keep it in contact with the tail 14 of the rocker 10 at all times (whether the solenoid 26 is not activated as illustrated in FIG. 2 and at times when the solenoid 26 is activated). As illustrated in FIG. 2 the second solenoid 25 is activated whereby it pushes against the tail 14 or the rocker 10 to bring the first rocker engagement face 11 into contact with the first cam engagement face 23 to provide for free rotation of the cam plate 2 in a clockwise direction relative to the rocker plate 3 with rotation in a counterclockwise manner being prevented. The second spring 29 is situated to keep the second solenoid 26 in contact with the tail 14 of the rocker 10 at times when the second solenoid 26 is not activated (at times when the clutch is in a neutral position and at times when the first solenoid 25 is activated). The first spring 30 is situated to keep the first solenoid 25 in contact with the tail 14 of the rocker 10 at times when the first solenoid 25 is not activated.

It is normally preferred for the rocker plate 3 to include an aperture 33 as illustrated in FIG. 1 which is situated in an orientation which allows lubricants to flow from the pocket 5 and away from the rocker 10 at times when the clutch is not in use. This is beneficial to prevent the clutch from "freezing-up" upon start up in cold weather applications. Accordingly, the aperture 33 is typically located at the low point of the clutch assemble with respect to gravitational flow.

Figure 3:
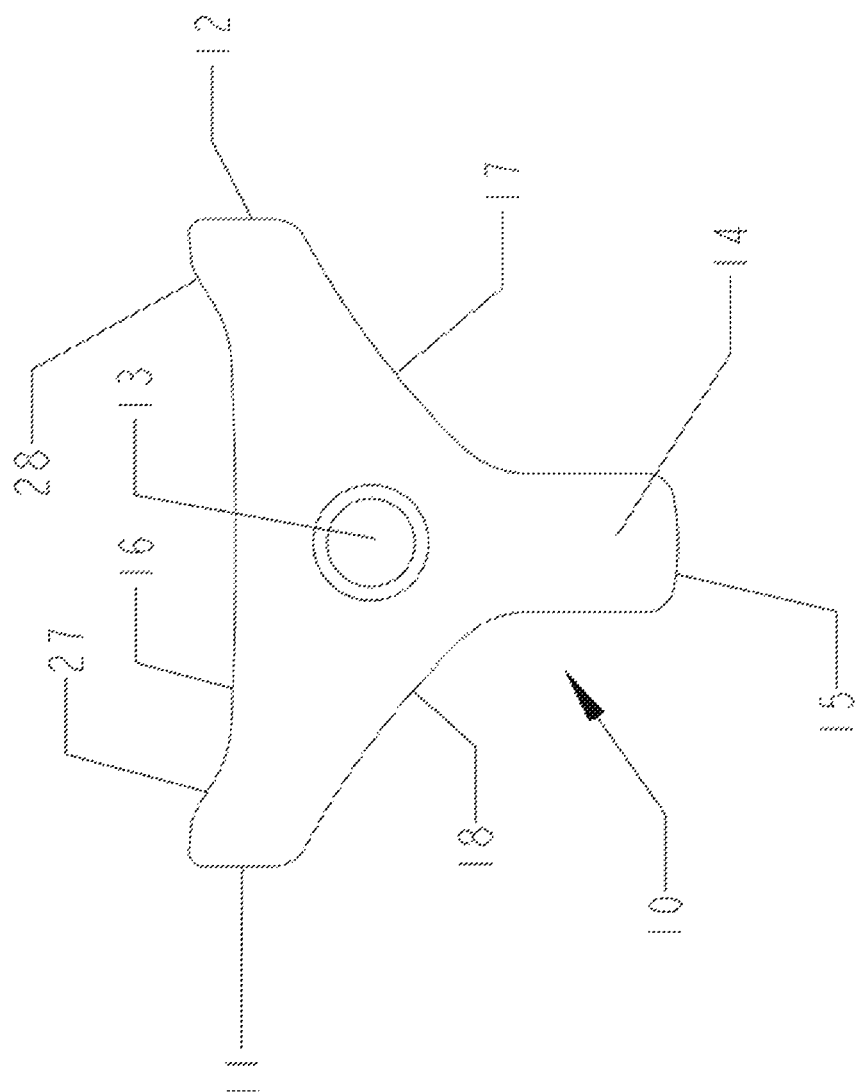
FIG. 3 illustrates a rocker which can be utilized in one embodiment of this invention.

A rocker 10 which is preferred for utilization in the practice of this invention is illustrated in FIG. 3. This rocker 10 has a first rocker engagement face 11, a second rocker engagement face 12, a first concaved region 16, a second concaved region 17, a third concaved region 18, a tail 14, and a pivot point 13, wherein the first concaved region 16 is situated between the first rocker engagement face 11 and the second rocker engagement face 12, wherein the second concaved region 17 which is situated between the second rocker engagement face 12 and the tail 14, and the third concaved region 18 which is situated between the tail 14 and the first rocker engagement face 11. The first concaved region 16 has a first sloped shoulder 27 which adjoins the first rocker engagement face 11 and has a second sloped shoulder 28 which adjoins the second rocker engagement face 12.

Figure 4:
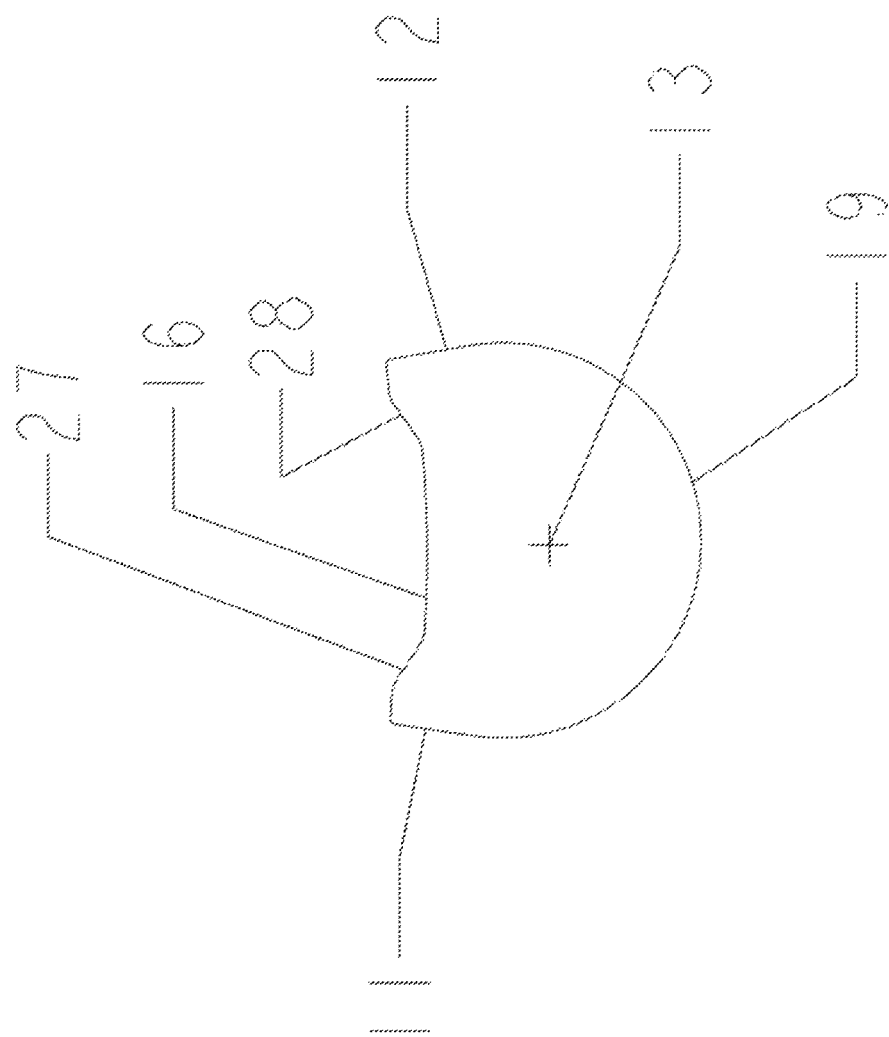
FIG. 4 illustrates a rocker which can be utilized in an alternative embodiment of this invention.

A rocker 10 having an alternative design for utilization in the practice of this invention is illustrated in FIG. 4. This rocker 10 is comprised of a first rocker engagement face 11, a second rocker engagement face 12, a first concaved region 16, and a circumferential tail region 19, wherein the first concaved region 16 is situated between the first rocker engagement face 11 and the second rocker engagement face 12, and wherein the circumferential tail region 19 extends from the first rocker engagement face 11 to the second rocker engagement face 12. The first concaved region 16 has a first sloped shoulder 27 which adjoins the first rocker engagement face 11 and has a second sloped shoulder 28 which adjoins the second rocker engagement face 12.

The rockers which are utilized in the practice of this invention can be manufactured utilizing conventional techniques, such as forging. However, it has been unexpected found that that rockers of high strength and durability that offer long service life can be made to a high level of tolerance by utilizing a powder metal composition that is comprised of (a) iron, (b) about 1 to about 4 weight percent chromium or nickel, (c) about 0.2 to about 1.0 molybdenum, and (d) about 0.3 weight percent to about 1.0 weight percent carbon.

The present invention more specifically discloses a process for manufacturing a powder metal rocker which comprises (1) placing a metal powder composition which includes (a) iron, (b) about 1 to about 4 weight percent chromium or nickel, (c) about 0.2 to about 1.0 molybdenum, and (d) about 0.3 weight percent to about 1.0 weight percent carbon into a mold, (2) compressing the metal powder in the mold into the shape of rocker under a pressure of 20 tons per square inch to 70 tons per square inch into a green rocker, (3) removing the green rocker from the mold, (4) either sintering and tempering the green rocker into the powder metal rocker or sintering, austenitizing, quenching and tempering the green rocker into the powdered metal rocker.

The present invention further reveals a powder metal rocker which includes a first rocker engagement face, a second rocker engagement face, a first concaved region, a second concaved region, a third concaved region, a tail, and a pivot point, wherein the first concaved region is situated between the first rocker engagement face and the second rocker engagement face, wherein the second concaved region which is situated between the second rocker engagement face and the tail, and a third concaved region which is situated between the tail and the first rocker engagement face, wherein the powder metal rocker is comprised of a metal composition including (a) iron, (b) about 1 to about 4 weight percent chromium or nickel, (c) about 0.2 to about 1.0 molybdenum, and (d) about 0.3 weight percent to about 1.0 weight percent carbon.

The present invention also discloses a powder metal rocker which includes a first rocker engagement face, a second rocker engagement face, a first concaved region, and a circumferential tail region, wherein the first concaved region is situated between the first rocker engagement face and the second rocker engagement face, and wherein the circumferential tail region extends from the first rocker engagement face to the second rocker engagement face, wherein the powder metal rocker is comprised of a metal composition including (a) iron, (b) about 1 to about 4 weight percent chromium or nickel, (c) about 0.2 to about 1.0 molybdenum, and (d) about 0.3 weight percent to about 1.0 weight percent carbon.

In manufacturing the powder metal rockers of this invention a mold of the desired shape is filled with a powder metal composition. After the metal powder formulation is introduced into the mold the powder is compressed under high pressure, typically from 20 to 70 tons per inch$^2$ (tsi) and more typically 40 to 65 tons per inch$^2$ (tsi). This compressed part or preform is then considered to be green or uncured. The green part is then cured or sintered by heating in a sintering furnace, such as an electric or gas-fired belt or batch sintering furnace, for a predetermined time at high temperature in an inert environment or reducing atmosphere. Nitrogen, vacuum and Nobel gases, such as helium or argon, are examples of such inert protective environments. Metal powders can be sintered in the solid state with bonding by diffusion rather than melting and re-solidification. Also, sintering may result in a decrease in density depending on the composition and sintering temperature. For instance, chromium containing compositions typically maintain or decrease in density while nickel containing compositions generally increase in density.

Typically, the sintering temperature utilized will be about 60% to about 90% of the melting point of the metal composition being employed. The sintering temperature will normally be in the range of 1830° F. (1000° C.) to 2450° F. (1343° C.). The sintering temperature will more typically be within the range of 2000° F. (1093° C.) to about 2400° F. (1316° C.). In any case, the appropriate sintering temperature and time-at-temperature will depend on several factors, including the exact chemistry of the metallurgical powder, the size and geometry of the compact, and the heating equipment used. Those of ordinary skill in the art may readily determine appropriate parameters for the molding steps to provide a green preform of suitable density and geometry which is then placed into a furnace at temperature which is within the range of 2000° F. (1093° C.) to 2450° F. (1343° C.) for approximately 30 minutes in a protective atmosphere to sinter the metal.

The final density of the part will vary widely depending on its composition and the particular pressing and sintering parameters employed. The density of the final part will normally be within the range of 6.6 g/cc to 7.5 g/cc. The final part will typically have a density which is within the range of 6.7 g/cc to 7.4 g/cc and will commonly have a density which is within the range of 6.9 g/cc to 7.3 g/cc.

The metal powders that can be utilized in manufacturing powder metal parts are typically a substantially homogenous powder including a single prealloyed alloyed or unalloyed metal powder or a blend of one or more such powders and, optionally, other metallurgical and non-metallurgical additives such as, for example, lubricants. Thus, "metallurgical powder" may refer to a single prealloyed powder or to a powder blend. In any case it is important for the powder metal composition used about 1 to about 4 weight percent chromium, about 0.2 to about 1.0 molybdenum, and about 0.3 weight percent to about 1.0 weight percent carbon. The balance of the composition constitutes iron. It is frequently preferred for the powder metal composition to contain about 2 to about 3.8 weight percent chromium, about 0.3 to about 0.7 molybdenum, and about 0.3 weight percent to about 0.9 weight percent carbon. It is normally more preferred for the powder metal composition to include about 2.5 to about 3.5 weight percent chromium, about 0.4 to about 0.6 molybdenum, and about 0.3 weight percent to about 0.9 weight percent carbon. In another embodiment of this invention the metal composition contains about 1.0 to 3.0 weight percent nickel. In some cases the metal composition will include about 1.5 to about 2.5 weight percent nickel, about 0.7 to about 1.0 weight percent molybdenum, and about 0.3 weight percent to about 0.9 weight percent carbon.

After being sintered it is normally preferred to temper the rocker made from the powder composition referred to in the first embodiment at a temperature which is within the range of about 300° F. (150° C.) to about 500° F. (260° C.) for a period of about 30 minutes to about 90 minutes. The rocker or strut is typically tempered for about 45 minutes to about 75 minutes (about 1 hour) to develop an optimal combination of hardness and strength. After being sintered, the powder composition referred to in the second embodiment must be austenitized, quenched and then tempered. Then the tempered rocker can be tumbled in a ceramic media. The part is then typically washed in an aqueous media that can optionally contain a detergent. This will frequently be done in hot water that has been heated to a temperature of 180° F. to 212° F. It is then preferably treated with a rust inhibitor and dried.

While certain representative embodiments and details have been shown for the purpose of illustrating the subject invention, it will be apparent to those skilled in this art that various changes and modifications can be made therein without departing from the scope of the subject invention.

What is claimed is:

1. A clutch assembly which is comprised of (1) a cam plate which includes cams which are spaced about a central axis; (2) a rocker plate which includes at least one pocket, wherein the pocket includes a first rocker plate engagement surface and a second rocker plate engagement surface; and (3) at least one rocker which is pivotally situated within the pocket of the rocker plate, said rocker having a first rocker engagement face, a first concaved region, a second rocker engagement face, and a pivot point, wherein the first rocker engagement face is complimentary to the first rocker plate engagement surface, wherein the second rocker engagement face is complimentary to the second rocker plate engagement surface, wherein the first rocker engagement face is complimentary to a first cam engagement face, wherein the second rocker engagement face is complimentary to a second cam engagement face, wherein pivotally rotating the rockers in a first pivot direction to bring the first rocker engagement face in complimentary contact with the first cam engagement face prevents rotation of the cam plate in a counterclockwise direction, wherein pivotally rotating the rockers in a second pivot direction to bring the second rocker engagement face in complimentary contact with the second cam engagement face prevents rotation of the cam plate in a clockwise direction, a first solenoid which is configured to pivot the rocker in the first pivot direction so as to bring the first rocker engagement face into complimentary contact with the first cam engagement face and to bring the second rocker engagement face into contact with the second rocker plate engagement surface on activation of the first solenoid, and a second solenoid which is configured to pivot the rocker in the second pivot direction so as to bring the second rocker engagement face into complimentary contact with the second cam engagement face and to bring the first rocker engagement face into contact with the first rocker plate engagement surface on activation of the second solenoid, wherein the rocker is further comprised of a tail, a second concaved region which is situated between the second rocker engagement face and the tail, and a third concaved region which is situated between the tail and the first rocker engagement face, wherein said clutch assembly includes a first spring and a second spring which act together to maintain the rocker in a neutral position at times when neither the first solenoid nor the second solenoid are activated, wherein the first spring has a first end which applies pressure to the first solenoid to keep it in contact with the tail of the rocker and a second end which is affixed to the rocker plate, wherein the second spring has a first end which applies pressure to the second solenoid to keep it in contact with the tail of the rocker and a second end which is affixed to the rocker plate, and wherein the first spring is affixed to the rocker plate at the opposite side of the tail from the side where the second spring is affixed to the rocker plate.

2. The clutch assembly of claim 1 wherein said clutch assembly includes at least two pockets which are spaced about the central axis and at least two rockers which are situated in the pockets.

3. The clutch assembly of claim 1 wherein said clutch assembly includes a plurality of pockets which are spaced about the central axis and a plurality of rockers which are situated in the pockets.

4. The clutch assembly of claim 1 wherein the rocker plate includes at least two pockets wherein a clockwise locking solenoid can be activated in the at least one pocket and wherein a counterclockwise solenoid can be activated in at least one other pocket to completely lock the rocker plate with the cam plate.

5. The clutch assembly of claim 1 wherein the rocker plate includes an aperture which extends from the pocket to the side of the rocker plate which is away from the cam plate at a position which is on the opposite side of the rocker from the cam plate.

6. The clutch assembly of claim 5 wherein the aperture is situated in an orientation which allows lubricants to flow from the pocket and away from the rocker.

7. The clutch assembly of claim 1 wherein the pivot point includes an aperture which extends through the rocker.

8. The clutch assembly of claim 1 wherein the first concaved region has a first sloped shoulder which adjoins the first rocker engagement face and has a second sloped shoulder which adjoins the second rocker engagement face.

9. The clutch assembly of claim 1 wherein the rocker is a powder metal rocker which is comprised of a metal composition including (a) iron, (b) 1 to 4 weight percent chromium or nickel, (c) 0.2 to 1.0 molybdenum, and (d) 0.3 weight percent to 1.0 weight percent carbon.

10. The clutch assembly of claim 9 wherein the metal composition has a density of at least 6.6 g/cc.

11. The clutch assembly of claim 9 wherein the metal composition has a density which is within the range of 6.6 g/cc to 7.5 g/cc.

12. The clutch assembly of claim 10 wherein the metal composition includes 2 to 3.8 weight percent chromium, 0.3 to 0.7 molybdenum, and 0.3 weight percent to 0.9 weight percent carbon.

13. The clutch assembly of claim 10 wherein the metal composition includes 1.5 to 2.5 weight percent nickel, 0.7 to 1.0 weight percent molybdenum, and 0.3 weight percent to 0.9 weight percent carbon.

14. The clutch assembly of claim 11 wherein the metal composition includes 2.5 to 3.5 weight percent chromium, 0.4 to 0.6 molybdenum, and 0.3 weight percent to 0.9 weight percent carbon.

* * * * *